UNITED STATES PATENT OFFICE.

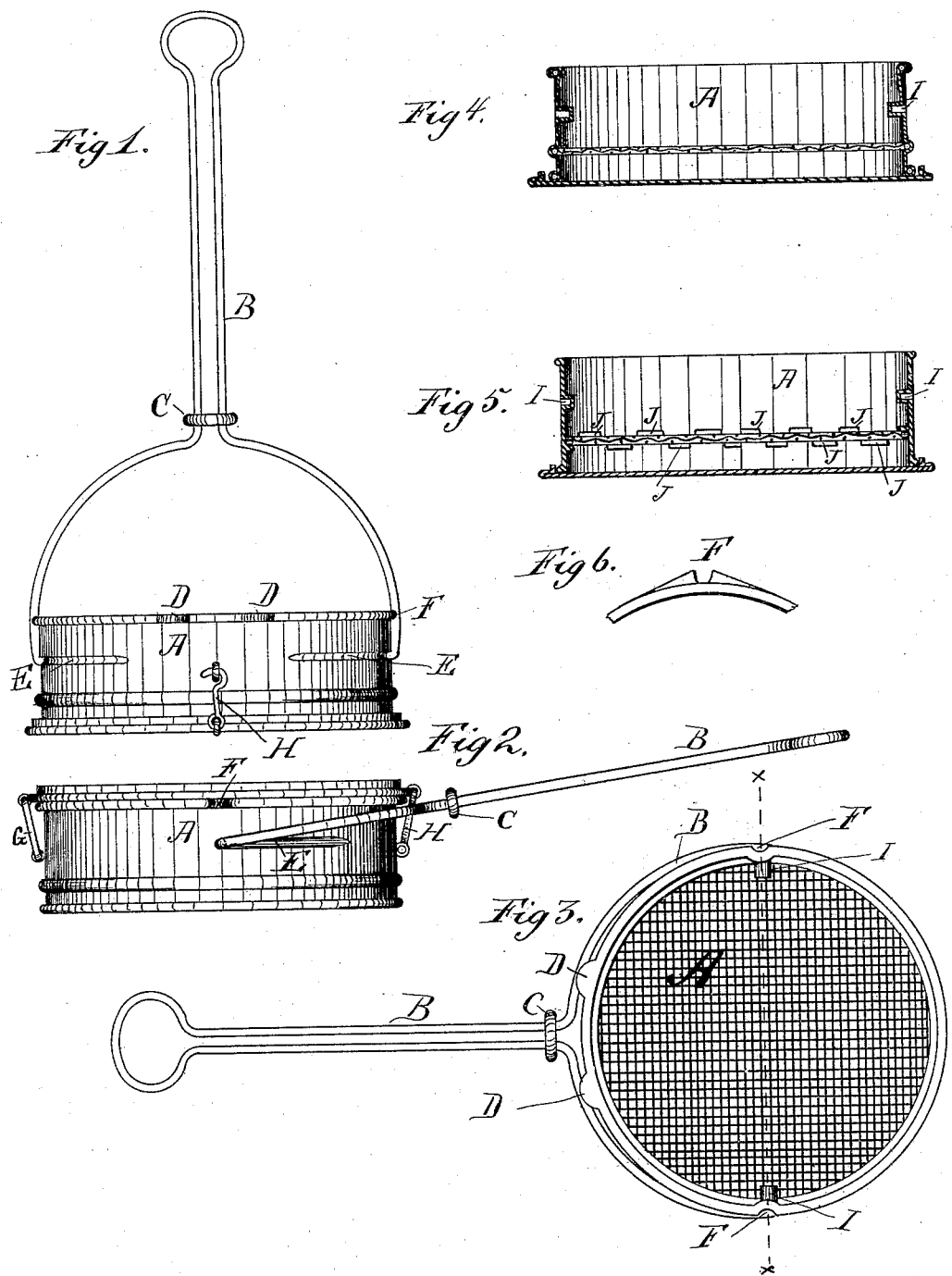

LYMAN E. PHELPS, OF ROCHELLE, ILLINOIS.

COMBINED ASH PAN AND SIFTER.

SPECIFICATION forming part of Letters Patent No. 331,322, dated December 1, 1885.

Application filed September 5, 1884. Serial No. 142,286. (No model.)

*To all whom it may concern:*

Be it known that I, LYMAN E. PHELPS, a resident of Rochelle, Ogle county, Illinois, and a citizen of the United States, have invented certain new and useful Improvements in Ash Pans and Sifters, of which the following is a specification.

The object of my invention is to provide or construct a combined ash pan and sifter that will obviate the necessity of emptying the ashes from the pan into the sifter, and so that it can easily be removed, operated, and replaced in the stove; and my invention consists in the arrangement and construction, as hereinafter more fully described and claimed.

In the drawings, Figure 1 represents my combined ash pan and sifter, with the bail in position for carrying. Fig. 2 represents it with the bail turned down to act as a handle, and the bottom turned over to act as a top. Fig. 3 is a plan view of the pan and sifter, showing lugs or projections to hold the handle in place during the operation of sifting. Fig. 4 is a vertical sectional view taken in line x x of Fig. 3. Fig. 5 is a vertical sectional view of the pan and sifter when made of cast-iron, showing the lugs or projections for holding the sieve in place; and Fig. 6 is a view of that portion of the rim in which the bail rests when the pan is being carried, and represents a modification of that part of the pan.

In the drawings, A represents the ash pan and sifter. B represents the bail or handle; C, a ring on such bail or handle; D, lips or projections on the rim of the sifter; E, grooves in the sides of the pan, leading to the bail-holes; F, the grooves or indentations in which the bail lies when the pan is carried; G, the hinge by which the bottom is attached to the pan; H, a hook for fastening it in place; I, the bail-holes; J, the lugs or projections to hold the sieve in place when the pan is made of cast-iron.

Similar letters of reference indicate similar parts.

In constructing my combined ash pan and sifter I place a sieve of suitable mesh in the pan. If the pan be made of sheet metal, indentures may be made around the inside of the pan, as shown in Fig. 4, into which the sieve may be sprung, and thus held in place. If, however, it be made of cast-iron, it should be in two parts, with lugs or projections cast around the inside where the sieve is to be placed, as shown in Fig. 5. After the sieve is placed in position between the retaining-lugs, the two parts of the cast-iron pan may be riveted or otherwise fastened together. I make the pan with bail-holes at it sides and with grooves leading along the outside of the pan to the bail-holes. The bottom is hinged at one side of the pan, midway between the bottom and the top, by a hinge, as shown in Fig. 2, so that it may be turned over and converted into a top. In either position, whether as top or bottom, I hold it in place by a suitable hook. (Shown in Figs. 1 and 2.)

The bail is made of elastic material, so that it may be sprung into position, where it will be held either by the spring or elasticity of the metal, or by a ring, which may be slipped down over it, as shown in the drawings. This bail is removed when the pan is placed in the stove, and is put in position by placing the two ends of the bail in the grooves along the outside of the sides of the pan, following which the bail-hooks slide into the bail-holes. The pan is then removed from the stove and the bail raised into position to carry the pan, during which the bail rests in the indentations or grooves extending upward from the bail-holes or placed in or on the pan, to prevent the pan from oscillating while carrying. These grooves may be made by indenting the sides of the pan, or by fastening lugs on the sides, as shown in Fig. 6.

When the sifting is to be done, the bail is turned down until it assumes the position shown in Fig. 2, and the ring slipped down into place, if the elasticity of the metal be insufficient, when the lips or projections D on the pan prevent the bail from being raised into an upright position and enable it to be operated as a handle. Similar lips or brackets may be placed below the handle, to prevent the pan from tipping from the person. The particular form of these projections is immaterial so long as they prevent the pan from tipping.

The advantages which result from this construction and arrangement of the ash pan and sifter are, that the two are combined into one device. The bottom of the pan is converted into the top during the operation of sifting, so that there can be no annoyance from the flying of the ashes upon the person of the sifter, and the bail of the pan is made also to serve as the handle of the sifter, and is removed or inserted as the pan is placed in or taken out of the stove, so that it is always cool.

I am aware of the Frank and Aub patent of January 25, 1876; but it does not show my construction or way of making the bottom convertible into a top or cover, or vice versa.

What I claim as new, and desire to secure by Letters Patent, is—

1. A combined ash pan and sifter provided with a bottom connected thereto by a hinged link, whereby it is made convertible into a top or cover, or vice versa, substantially as described.

2. A combined ash pan and sifter provided with grooves E and bail-holes I, in combination with a removable bail or spring-handle, B, substantially as described, and for the purpose set forth.

LYMAN E. PHELPS.

Witnesses:
THOMAS A. BANNING,
C. C. LINTHICUM.